United States Patent [19]

Keck

[11] 3,996,470
[45] Dec. 7, 1976

[54] LASER ALTERATION OF ACCOMMODATION COEFFICIENT FOR ISOTOPE SEPARATION

[75] Inventor: James C. Keck, Andover, Mass.

[73] Assignee: Jersey Nuclear-Avco Isotopes, Inc., Bellevue, Wash.

[22] Filed: Oct. 15, 1974

[21] Appl. No.: 514,303

[52] U.S. Cl. .......................... 250/423 P; 250/281; 250/282
[51] Int. Cl.² ........................................ H01J 39/34
[58] Field of Search ....... 250/281, 282, 288, 423 P, 250/424; 55/17

[56] References Cited

UNITED STATES PATENTS

| 3,616,596 | 11/1971 | Campargue | 55/17 |
| 3,626,665 | 12/1971 | Fenn et al. | 55/17 |
| 3,788,038 | 1/1974 | Zahner | 55/17 |
| 3,853,528 | 12/1974 | Wodrich et al. | 55/17 |

FOREIGN PATENTS OR APPLICATIONS 1,284,620 8/1972 United Kingdom

*Primary Examiner*—Alfred E. Smith
*Assistant Examiner*—B.C. Anderson
*Attorney, Agent, or Firm*—Weingarten, Maxham & Schurgin

[57] ABSTRACT

Method and apparatus for separating isotope types by inducing an isotopically selective vibrational excitation of molecules containing at least one atom of the element type whose isotopes are to be separated. Vibrational excitation is induced in the molecules by finely tuned, narrow bandwidth laser radiation applied to a gaseous flow of the molecules. Isotopic separation of the molecules is achieved from the enhanced difference in diffusion rates for the molecules due to an alteration of the accommodation coefficients in the excited molecules.

40 Claims, 4 Drawing Figures

FIG. 1
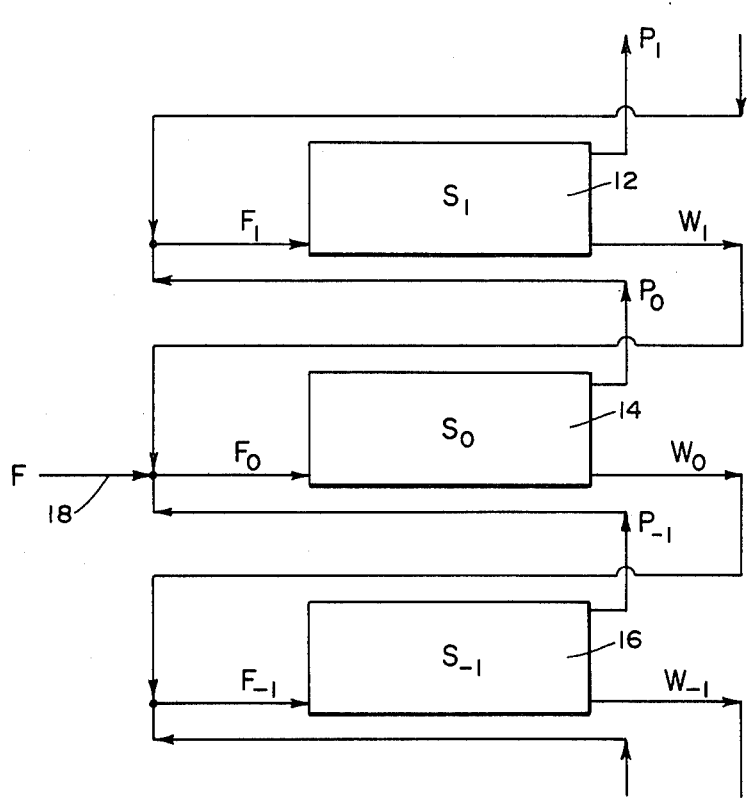
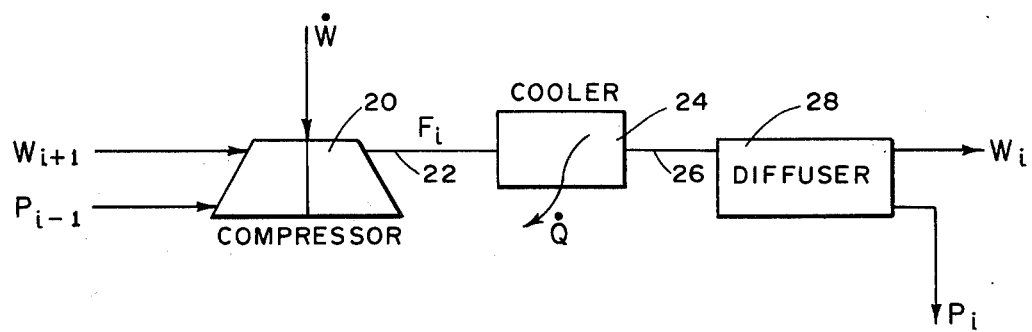
FIG. 2

LASER ALTERATION OF ACCOMMODATION COEFFICIENT FOR ISOTOPE SEPARATION

FIELD OF THE INVENTION

This invention relates to isotope separation and in particular to enhanced isotope separation from laser induced accommodation coefficient alteration.

BACKGROUND OF THE INVENTION

Present day production level uranium enrichment, i.e. separation of the U-235 isotope, is achieved by what is commonly known as the gaseous diffusion technique. According to known aspects of this technique, molecules of uranium hexafluoride ($UF_6$) are forced under pressure through sets of small holes or channels in a diffusion screen which constricts the flow of the uranium hexafluoride gas and very slightly affects its flow rate in accordance with molecular weight. Thus the flow rate through the channels will be a function of isotope type permitting a small, typically 0.2% enrichment per stage. The enrichment is typically improved by cascading several stages using both feedback and feedforward systems between waste and product streams respectively.

The very small mass difference between the atoms of different isotope types making up the uranium hexafluoride molecule and even smaller total relative mass difference between the complete molecules places a limit upon the difference in diffusion rates which may be achieved for the isotopically distinct molecules. This limit is, as indicated above, very small and necessitates the cascading of many stages of diffusion channels if uranium is to be enriched from its naturally occurring concentration of about 0.7% up to approximately 2–4% for typical use in power generating reactors.

A wholly different approach to uranium enrichment is described in U.S. Pat. No. 3,772,519 which utilizes differences in radiation absorption frequency between isotope types, particularly of elemental uranium, to permit ionization of particles of one isotope type so that a separation may be created electrically.

BRIEF SUMMARY OF THE INVENTION

In a preferred embodiment, the present invention enhances the diffusion separation effect by applying finely tuned radiant energy to diffusing molecules to induce a vibration in the molecules having atoms of a selected isotope type. The vibrational excitation permits more efficient isotope separation in diffusion techniques. Where diffusion rate is the operative factor to induce a separation amongst the isotope types, the applied radiant energy and resulting vibrational excitation of the gaseous molecules of the selected isotope type can be made to adjust the accommodation coefficient of the molecules flowing through the diffusion channels. The temperatures of the gas and channels are maintained to insure that the molecules will rebound from the walls of the channels with less than pure elasticity but will have some degree of accommodation or "stick." A variation in the accommodation coefficient will exist between vibrationally excited molecules and those not excited and will greatly vary the diffusion rate for these molecules based upon isotope type. This is because the unexcited molecules will tend to stick more at each rebound and thus diffuse more slowly down the channel. There results a greatly improved separation factor between the product and waste streams for a single diffusion stage having an isotopically selective laser induced change in accommodation coefficient.

BRIEF DESCRIPTION OF THE DRAWINGS

These and other features of the invention are more fully described below in the detailed description of the preferred embodiment presented for purposes of illustration and not by way of limitation, and in the accompanying drawings of which:

FIG. 1 is a system block diagram showing possible staging arrangements for multi-staged isotope separation employing techniques of the present invention;

FIG. 2 is a system block diagram of a single stage according to the invention;

DETAILED DESCRIPTION OF THE PREFERRED EMBODIMENT

Figure 3:
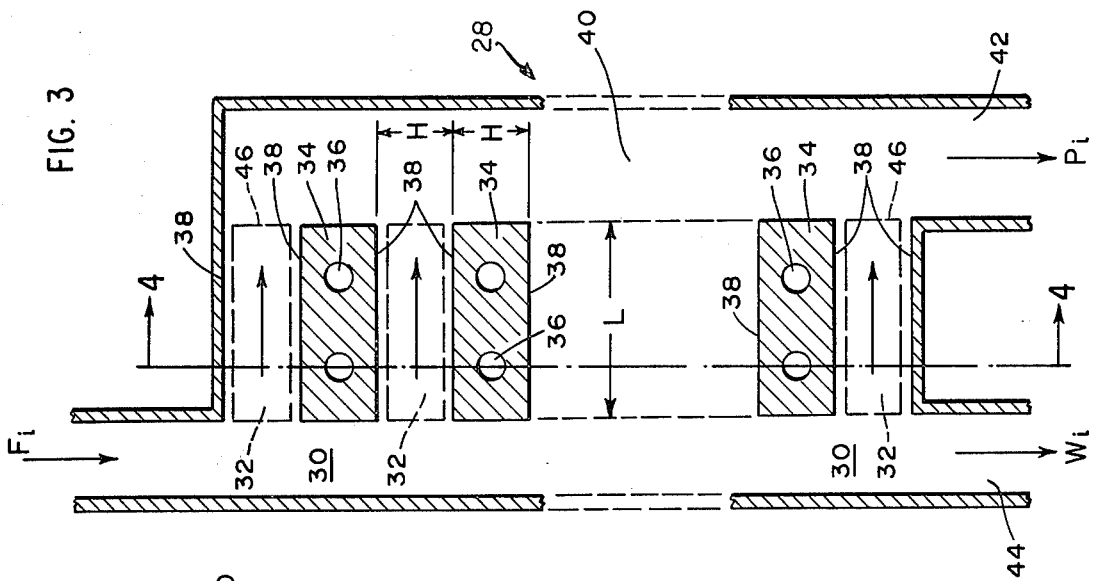
FIG. 3 is an internal apparatus configuration diagram for a portion of the FIG. 2 structure.

The present invention contemplates a system for improving the efficiency of isotope separation processes and their corresponding apparatus by inducing a state of vibrational excitation in molecules containing atoms of one isotope type. The vibrational excitation is typically induced by laser irradiation of a gaseous environment of molecules containing atoms of plural isotope types of a common element, typically uranium. The excited, vibrating molecules possess a characteristic which permits a separation of the molecules based on isotope types to a greater degree than could be achieved without the vibrational excitation of the molecules in, for example, the gaseous diffusion process.

The laser excitation employed to produce a vibrational excitement of the molecules in the present invention is to be distinguished from laser induced excitation of electron energies in atoms or molecules as, for example, represented in U.S. Pat. Nos. 3,443,087 and 3,772,519. In the latter, laser excitation, typically of a substantially higher frequency, is employed to produce a transition in the energy state of, for example, a uranium atom by forcing an outer orbital electron to step to a more remote electron orbit, and ultimately to an ionized state through radiation absorption or other mechanisms. In the present invention, laser radiation is employed to produce vibration of molecular atoms from energy imparted by photon absorption by the molecule. The laser radiation absorbed by the molecule induces a vibrational excitation of the atoms of the molecule such as by an oscillation of the molecule elements about their molecular bond forces. In this sense, the laser excitation can be viewed as inducing a strictly mechanical oscillation of the molecule. For this result, the laser is preferably selected for its capability of being tuned to a specific frequency which will vibrationally excite the molecule. Additionally, the laser is adjusted so that its output wavelength is suitably limited to provide isotopic selectivity in the molecules that are vibrationally excited.

In the case of uranium hexafluoride, isotopic selectivity in vibrational excitation of the molecules is possible because of the slight mass difference between the U-235 and U-238 atoms which comprise one atom of the seven atom uranium hexafluoride molecule. The properties of the molecule which permit mechanical harmonic oscillation are described by the second order differential equation relating atomic mass and molecular bond restraints. Since the masses for the different uranium isotopes differ by the isotope mass differences, the harmonic oscillation frequencies for vibrational excitation of the molecules will differ accordingly.

In this case, the uranium hexafluoride molecule is of particular interest due to the fact that each molecule contains but one atom of the element whose isotopes are to be separated. Were there to be more than one atom of that particular element, there would be a proliferation of the number of absorption lines where the desired isotope type occurred in different percentages in each molecule and there could be a less clear distinction between the frequencies for absorption lines.

With these considerations as background to the invention, the exemplary apparatus and processes for implementing it may now be described with reference to the drawings. In particular, in the process of the present invention, it may be desirable to employ several enrichment stages in a cascaded fashion, each receiving an input of gaseous phase molecules (e.g., $UF_6$) and providing an enriched output or product stream, as well as a depleted or waste output stream. The enriched stream may be applied to the next higher order enrichment stage, and the depleted stream applied to the next lower order enrichment stage. Such a general scheme is illustrated with respect to FIG. 1. Shown there are a plurality of stages 12, 14 and 16 ($S_1$, $S_0$ and $S_{-1}$), representing only three stages in a multi-stage enrichment plant. As shown in FIG. 1, the gaseous state molecules are applied through a feed line 18 ($F_0$) at the center stage 14 ($S_0$). The feed to stage 14 is a mixture of the feed line 18 with the waste line $W_1$ of stage 12 ($S_1$), and product line $P_{-1}$ of stage 16 ($S_{-1}$). The product output of stage 14 ($P_0$) is applied ahead to the next higher order stage 12 ($S_1$), along with the depleted output, $W_2$, from the previous next higher order stage, $S_2$, not shown. The feed line $F_1$ to stage 12 ($S_1$) is the combination of the waste line output $W_0$ of stage 14, and the product line output $P_{-2}$ of the stage $S_{-2}$, not shown. As many stages either side of stage 14 may be employed as is desirable for the total system enrichment. The total enrichment is the product of the individual stage enrichment factor raised to the power of the number of stages in the chain.

In the exemplary implementation of the system according to the present invention, each stage in the chain illustrated in FIG. 1 will typically contain the components illustrated in FIG. 2. The adjacent stage waste and product feed inputs, generally represented by the quantities $W_{i+1}$ and $P_{i-1}$, are applied to respective different ports of a compressor 20. The $P_{i-1}$ gaseous flow will typically be at a lower pressure than the $W_{i+1}$ flow and accordingly will be applied to the compressor 20 at different pressure points to provide an output flow $F_i$ in a line 22, representing a mixture of the waste and product input flows at the appropriate pressure. The flow line 22 is applied to a cooler stage 24 which may typically include a heat exchanger coil adapted to provide a flow output in a line 26 at a defined temperature for all stages. The temperature in this conduit 26 is controlled to maintain a gaseous state for excited and unexcited molecules flowing in the conduit 26 and to provide an effective accommodation coefficient for both molecule types in a subsequent diffusion stage 28. This criteria is more particularly stated as the requirement of maintaining a sufficiently high temperature to avoid condensation of all molecules while at the same time keeping the temperature sufficiently low to insure a significant population of the lower lying energy states, especially the ground energy state for the $UF_6^{235}$ molecules. A temperature of 200° K appears to be reasonably typical for this purpose and provides a 4% theoretical ground state population.

Figure 4:
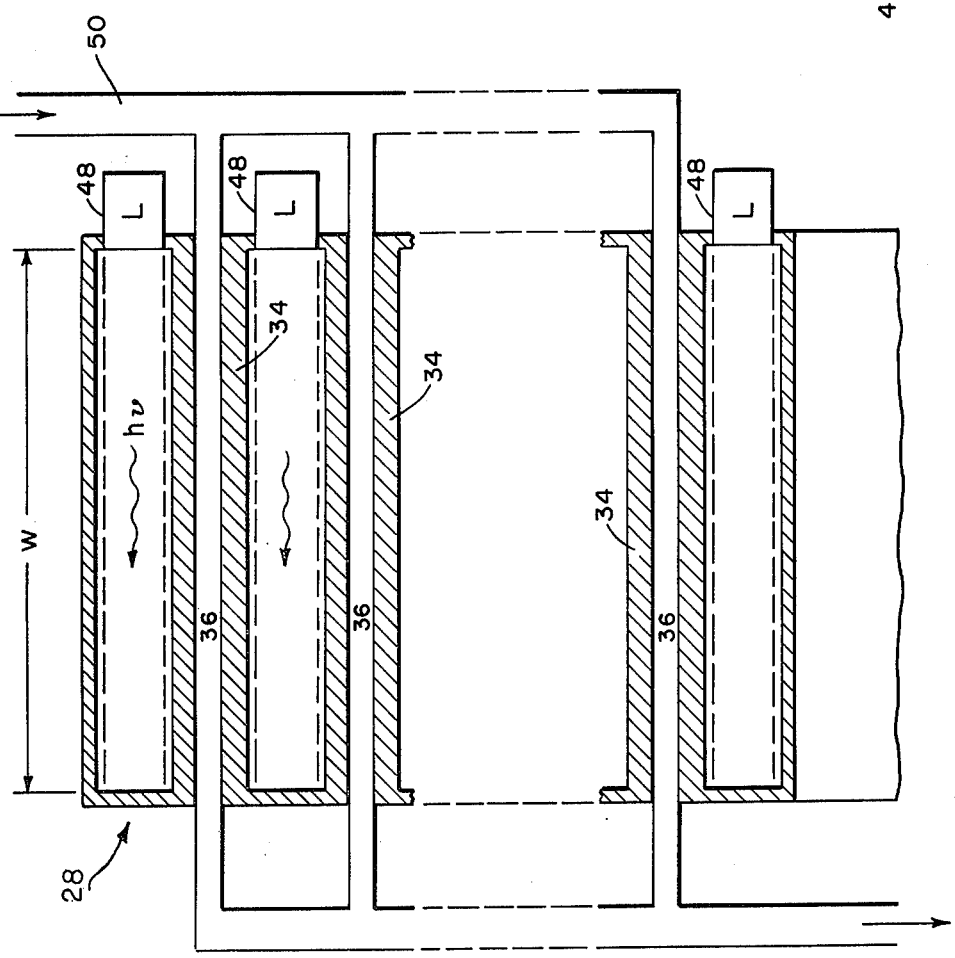
FIG. 4 is a similar internal structural view along section lines indicated in FIG. 3.

The apparatus comprising the diffusion stage 28 in the preferred embodiment of the present invention is shown in interior section in FIGS. 3 and 4. Referring to these FIGS. and especially to FIG. 3, the cooled gaseous feed in line 26 is applied to a manifold 30 running the length of the diffusion stage 28. The manifold 30 distributes input gas to a series of channels 32 spaced along the length of the manifold 30 and bounded by channel separators 34. The channel separators 34 contain cooling ports 36 through which a cooling liquid, such as water, is applied to remove the heat produced in the system by laser radiation so as to maintain the temperature of the flow at the same level as in the conduit 26. The channel separators 34 provide channel walls 38 which act as boundaries for the channels. The gas which flows through the channels 32 enters an outlet manifold 40 which communicates with a product output conduit 42. The extension of the manifold 30 beyond the regions of channels 32 to a conduit 44 contains the waste output stream. The region of the channels 32 between the walls 38, defined by the dotted lines as a solid space 46 of rectangular proportions, is illuminated by laser radiation from plural laser systems 48 illustrated in FIG. 4 along the section lines shown in FIG. 3. As also more clearly shown in FIG. 4, the coolant applied to the passages 36 is supplied through an input manifold 50 and exhausted through an output manifold 52. Temperature considerations listed above apply here as well. A lower limit to temperature would be the case where the unexcited molecules condense or change phase upon striking the walls of channels 32. The laser systems 48 may typically comprise continuous laser systems. Typical excitation frequencies are near 624 cm$^{-1}$ and 825 cm$^{-1}$. The laser systems which may be employed to produce this radiation include lead salt (Pb Se) diode lasers for the first frequency or $CS_2$ vapor lasers for the second frequency. For the $CS_2$ laser, the vapor is formed from the C-13 isotope of carbon to tune to the 825 cm$^{-1}$ absorption line.

The laser radiation applied to the solid rectangular regions 46 is limited in bandwidth by known frequency selective techniques to produce a selective excitation of molecules having, in the example given, the uranium hexafluoride form with U-235 as the uranium atom of the molecule. Where the temperature of the gas in the channels 32 is controlled as indicated above, the unexcited molecules will strike or react with the walls 38 and stick for a short period. This period is widely dependent upon temperature. For a purely elastic rebound of excited particles about a 10$^{-13}$ second interval or one vibrational period is typical so a "stick" one order of magnitude, or 10$^{-12}$ seconds, would be satisfactory. This stick phenomenon, termed accommodation, is described by an accommodation coefficient, $\alpha$. The more rapid passage of the vibrationally excited molecules through the channels 32 results in an enrichment of molecules of the excited isotope type in the output port 40 as compared to the input manifold 30, and leads to a depletion of the excited isotope in the waste conduit 44.

This effect may be seen quantitatively from the equation for the diffusion rate $\Gamma$:

$$\Gamma = nu = \frac{\pi}{4}\left(\frac{\overline{hc}}{\alpha}\right)\frac{dn}{dx}$$

where $n$ is the gas density; $u$ is velocity down the channel, $c$ is the average velocity of molecules; $\alpha$ is the accommodation coefficient and $dn/dx$ is the particle density gradient along the channel. Using the subscripts A and B to designate these terms for the U-235 and U-238 isotopes, and after some algebra, it is seen that $$\left(\frac{n_A \text{ product}}{n_B \text{ product}}\right) \div \left(\frac{n_A \text{ feed}}{n_B \text{ feed}}\right) = \left(\frac{m_B}{m_A}\right)^{1/2} \frac{\alpha_B}{\alpha_A}$$

where $m$ is molecular mass.

Thus the density ratios at the product and feed points will be related both by the square root of the isotope mass ratio as well as the ratio of the accommodation coefficient. The mass ratios provide the basis for separation in standard diffusion technology and are limited to a maximum separation factor of about 1.004 per stage for uranium due to the closeness of the isotope masses. The accommodation coefficient, however, may be expected to vary by a factor of two or better giving a separation factor of two or higher which is a vast improvement. Where uranium U-235 molecules are excited, the mass differences and accommodation coefficient differences will affect diffusion in the same direction so that the two effects reinforce.

Using the designations H and L as the dimensions for the respective separation and length of walls 38 in channels 32, the requirements of efficient enrichment according to the technique of laser modification of the accommodation coefficient, place constraints on the dimensions H and L. Since it is necessary that the diffusing molecules make several collisions with the walls in each passage through the channels 32, the length L must be much greater than the separation H. The separation H must also be much less than the mean free path between molecular collisions to insure a much higher probability of molecule-wall collisions than molecule-molecule collisions. This avoids loss of vibrational excitation as well as selectivity of excitation.

Additionally, the separation H must be greater than the excitation laser wavelength to permit its propagation down the channels 32. Finally, the theory employed is based upon flow velocities which do not exceed the subsonic.

The present invention is not to be construed as limited to the specific preferred embodiment described above, but extends to the modifications of and alternatives to this exemplary teaching which fall within the scope of the following claims.

What is claimed is:
1. A method for producing isotopic separation among molecules having plural isotopes of an atom, the method comprising the steps of:
   establishing a flowing environment of the molecules having an atom thereof present in several isotope types;
   inducing isotopically selective vibrational excitation of the molecules of said flowing environment by exposing said molecules to electromagnetic radiation so as to produce molecular vibration of molecules having an atom of a predetermined isotope type without correspondingly inducing vibration of molecules having an atom of another isotope type;
   physically reacting the flowing molecules with at least one body to alter the flow thereof as a function of vibrational excitation of the molecules so that the concentration of said predetermined isotope type is increased in at least one region of the flowing environment, thereby effecting isotopic separation.

2. The method of claim 1 wherein said step of reacting the flowing molecules with at least one body includes applying the flowing molecules across a surface of a channel.

3. The method of claim 2 further including a diffusion barrier having plural channels.

4. The method of claim 3 wherein said molecules include a gaseous compound of uranium.

5. The method of claim 4 wherein said gaseous compound of uranium includes a halogen compound.

6. The method of claim 5 wherein said compound is $UF_6$.

7. The method of claim 2 further including:
   the step of maintaining the temperature of the surface to permit a bounce reaction of the molecules with the surface with an accommodation coefficient for the bounce reaction dependent upon the vibrational excitation of the bouncing molecules;
   the accommodation coefficient for the vibrationally excited molecules having atoms of the predetermined isotope type producing a more rapid flow thereof across the surface.

8. The method of claim 1 wherein said flow of molecules is subsonic.

9. The method of claim 1 wherein the radiant energy applying step includes the step of applying laser energy.

10. The method of claim 9 wherein said laser energy includes continuous radiation from a lead salt diode laser.

11. The method of claim 10 wherein said molecules include $UF_6$ and the lead salt laser is tuned to an absorption line for $UF_6^{235}$ near 624 wave numbers.

12. The method of claim 9 wherein said laser energy includes continuous radiation from a $CS_2$ laser.

13. The method of claim 12 wherein said molecules include $UF_6$ and the $CS_2$ laser is tuned to an absorption line for $UF_6^{235}$ near 825 wave numbers.

14. The method of claim 1 further including the steps of:
   repeating the inducing and reacting steps on molecules enriched in the predetermined isotope; and
   repeating separately on the molecules depleted in the predetermined isotope the inducing and reacting steps.

15. A method for producing a separation among particles having at least one atom of plural isotope types, the method comprising the steps of:
   establishing a flowing environment of the molecules having an atom thereof present in said environment in several isotope types;
   inducing vibrational excitation of the molecules of said flowing environment with isotopic selectivity by exposing said molecules to electromagnetic radiation so as to produce molecular vibration of those molecules having said atom of the one isotope type without correspondingly inducing vibration of molecules having said atom of another isotope type;
   directing the flow of molecules of said environment into a plurality of diffusion channels;

controlling the temperature of walls of said channels to permit bouncing of the molecules of said environmental flow from walls of said channels with an accommodation coefficient varying with the vibrational excitation of the molecules in said flow so as to produce different relative concentrations of said plural isotope types in different regions of said channels.

16. The method of claim 15 further including the step of separately reapplying the molecules from said flow which pass through said channels and which do not pass through said channels to the inducing and directing steps.

17. The method of claim 15 wherein said molecules include $UF_6$ and said inducing step includes the step of applying infrared laser radiation to the flowing particles.

18. A method for producing a separation among molecular particles having at least one uranium atom of plural isotope types, the method comprising the steps of:
establishing a flowing environment of the molecules having the uranium atom of the plural isotope types;
controlling the temperature of the flowing environment to a temperature above condensation but sufficiently low to provide significant populations of the molecules in low vibrational energy states;
applying the flowing environment to a set of channels;
illuminating the channels with electromagnetic radiation of spectral content to vibrationally excite the molecules having U-235 atoms without correspondingly excitation of molecules having another uranium isotope type;
physically reacting the flowing molecules with the walls of said channels to alter the flow thereof as a function of vibrational excitation of the molecules;
cooling the illuminated channels;
collecting the molecules passing through said channels in a product conduit of molecules having a concentration of U-235 atoms which is higher than the concentration of U-235 atoms in the flowing environment applied to said set of channels; and
collecting the molecules not passing through said channels in a waste stream having a concentration of U-235 atoms lower than the concentration of U-235 atoms in the flowing environment applied to said set of channels.

19. The method of claim 18 wherein said channels are wider than the wavelength of the electromagnetic radiation.

20. The method of claim 19 wherein the width of said channels is small relative to the mean free path of molecules in said channels.

21. The method of claim 18 wherein said channels are dimensioned to produce plural rebounding of the molecules from the channel walls in passing through the channels.

22. Apparatus for producing isotopic separation among molecules having plural isotopes in an atom comprising:
means for establishing a flowing environment of the molecules having an atom thereof present in several isotope types;
means for inducing isotopically selective vibrational excitation of the molecules of said flowing environment by exposing said molecules to electromagnetic radiation so as to produce molecular vibration of molecules having an atom of a predetermined isotope type without correspondingly inducing vibration of molecules having an atom of another isotope type;
at least one body physically reacting with the flowing molecules to alter the flow thereof as a function of vibrational excitation of the molecules so that the concentration of said predetermined isotope type is increased in at least one region of said flowing environment, thereby effecting isotopic separation.

23. The apparatus of claim 22 wherein the at least one body includes a surface of a channel.

24. The apparatus of claim 23 further including a diffusion barrier having plural channels.

25. Apparatus of claim 24 wherein said molecules include a gaseous compound of uranium.

26. The apparatus of claim 24 further including:
means for maintaining the temperature of the surface to permit a bounce reaction of the molecules with the surface with an accommodation coefficient for the bounce reaction dependent upon the vibrational excitation of the bouncing molecules;
the accommodation coefficient for the vibrationally excited molecules having atoms of the predetermined isotope type producing a more rapid flow thereof across the surface.

27. The apparatus of claim 22 wherein said flow of molecules is subsonic.

28. The apparatus of claim 22 wherein the radiant energy applying means includes laser means.

29. The apparatus of claim 28 wherein said laser means includes a lead salt diode laser.

30. The apparatus of claim 29 wherein said molecules include $UF_6$ and the lead salt laser is tuned to an absorption line for $UF_6^{235}$ near 624 wave numbers.

31. The apparatus of claim 28 wherein said laser means includes a $CS_2$ laser.

32. The apparatus of claim 31 wherein said molecules include $UF_6$ and the $CS_2$ laser is tuned to an absorption line for $UF_6^{235}$ near 825 wave numbers.

33. Apparatus for producing a separation among molecular particles having at least one atom of plural isotope types comprising:
means for establishing a flowing environment of the molecules having an atom thereof present in said environment in several isotope types;
means for exposing said molecules to electromagnetic radiation to induce vibrational excitation of the molecules of said flowing environment with isotopic selectivity so as to produce molecular vibration of those molecules having said atom of the one isotope type without correspondingly inducing vibration of molecules having said atom of another isotope type;
a plurality of diffusion channels;
means for directing the flow of molecules of said environment into the plurality of diffusion channels;
means for controlling the temperature of walls of said channels to permit bouncing of the molecules of said environmental flow from walls of said channels with an accommodation coefficient varying with the vibrational excitation of the molecules in said flow thereby producing different relative concentrations of said plural isotope types in different regions of said channels.

34. The apparatus of claim 33 wherein:
said molecules include $UF_6$; and said inducing means includes means for applying infrared laser radiation to the flowing particles.

35. Apparatus for producing a separation among molecular particles having at least one uranium atom of plural isotope types comprising:
- means for establishing a flowing environment of the molecules having the uranium atom of the plural isotope types;
- means for controlling the temperature of the flowing environment to a temperature above condensation but sufficiently low to provide significant populations of the molecules in low vibrational energy states;
- a set of channels having the flowing environment applied thereto;
- means for illuminating the channels with electromagnetic radiation of spectral content to vibrationally excite the molecules having U-235 atoms without corresponding excitation of molecules having another uranium isotope type;
- means for cooling the illuminated channels such that the temperature of the walls of said channels is controlled to permit bouncing of the molecules of said environmental flow from walls of said channels with an accommodation coefficient varying with the vibrational excitation of the molecules in said flow;
- means for collecting the molecules passing through said channels in a product stream of molecules having a concentration of U-235 atoms which is higher than the concentration of U-235 atoms in the flowing environment applied to said set of channels; and
- means for collecting the molecules not passing through said channels as a waste stream having a concentration of U-235 atoms lower than the concentration of U-235 atoms in the flowing environment applied to said set of channels.

36. The apparatus of claim 35 wherein said channels are wider than the wavelength of the electromagnetic radiation.

37. The apparatus of claim 36 wherein the width of said channels is small relative to the mean free path of molecules in said channels.

38. The apparatus of claim 35 wherein said channels are dimensioned to produce plural rebounding of the molecules from the channel walls in passing through the channels.

39. A method for producing isotopic separation among molecules in a flowing environment in which said molecules have an atom thereof present in a plurality of isotope types, and further in which at least one of said plurality of isotope type molecules is in a state of vibrational excitation resulting from electromagnetic irradiation with respect to another of said plurality of isotope type molecules, the method comprising the step of:
- physically reacting the molecules of said flowing environment with at least one body to alter the flow thereof as a function of vibrational excitation of the molecules so that the concentration of at least one of said plural isotope types is increased in at least one portion of the flowing environment as a function of molecular vibrational excitation, thereby effecting isotopic separation.

40. A method for producing a separation among molecular particles having at least one atom of plural isotope type molecules, at least one of said plural isotope types being in a vibrationally excited state resulting from electromagnetic irradiation with respect to another of said plural isotope type molecules, the method comprising the steps of:
- establishing a flowing environment of the molecules;
- directing the molecules of said flowing environment into a plurality of diffusion channels; and
- controlling the temperature of walls of said channels to permit bouncing of the molecules of said flowing environment from walls of said channels with an accommodation coefficient varying with the vibrational excitation of the molecules in said flowing environment so as to produce different relative concentrations of said plural isotope types in different regions of said channels.

* * * * *